United States Patent

[11] 3,559,745

[72] Inventors Howard G. Thompson
    Livonia;
    Ole J. Thorsrud, Dearborn Heights, Mich.
[21] Appl. No. 664,681
[22] Filed Aug. 31, 1967
[45] Patented Feb. 2, 1971
[73] Assignee Massey-Ferguson Inc.
    Detroit, Mich.

[54] MULTIPLE BOTTOM PLOW
    5 Claims, 4 Drawing Figs.
[52] U.S. Cl. .................................. 172/285,
    172/324
[51] Int. Cl. ................................... A01b 69/08,
    A01b 59/02
[50] Field of Search .......................... 172/679,
    282—286, 291, 324, 325; 280/463

[56] References Cited
    UNITED STATES PATENTS

| | | | |
|---|---|---|---|
| 2,655,851 | 10/1953 | Pursche | 172/324X |
| 3,061,020 | 10/1962 | Mannheim | 172/285 |
| 1,547,806 | 7/1925 | Graham | 172/324X |
| 2,777,373 | 1/1957 | Pursche | 172/324X |
| 1,226,793 | 5/1917 | Morgan | 172/284 |
| 1,243,704 | 10/1917 | Butler | 172/679X |
| 1,698,188 | 1/1929 | Cox | 172/679X |
| 1,823,508 | 9/1931 | Paul | 172/679 |
| 1,944,674 | 1/1934 | Silver | 172/284 |
| 2,982,363 | 5/1961 | Sweet et al. | 172/284 |

FOREIGN PATENTS

| | | | |
|---|---|---|---|
| 1,037,884 | 8/1966 | Great Britain | 172/324 |

Primary Examiner—Robert E. Pulfrey
Assistant Examiner—Alan E. Kopecki
Attorney—Gerhardt, Greenlee & Farris ABSTRACT: A multiple bottom plow including a frame having a hitch member which is pivotally connected to the frame so that the position of the plow relative to the tractor can be laterally shifted. A hydraulic ram is interconnected between the frame and hitch member for adjusting the position of the hitch member.

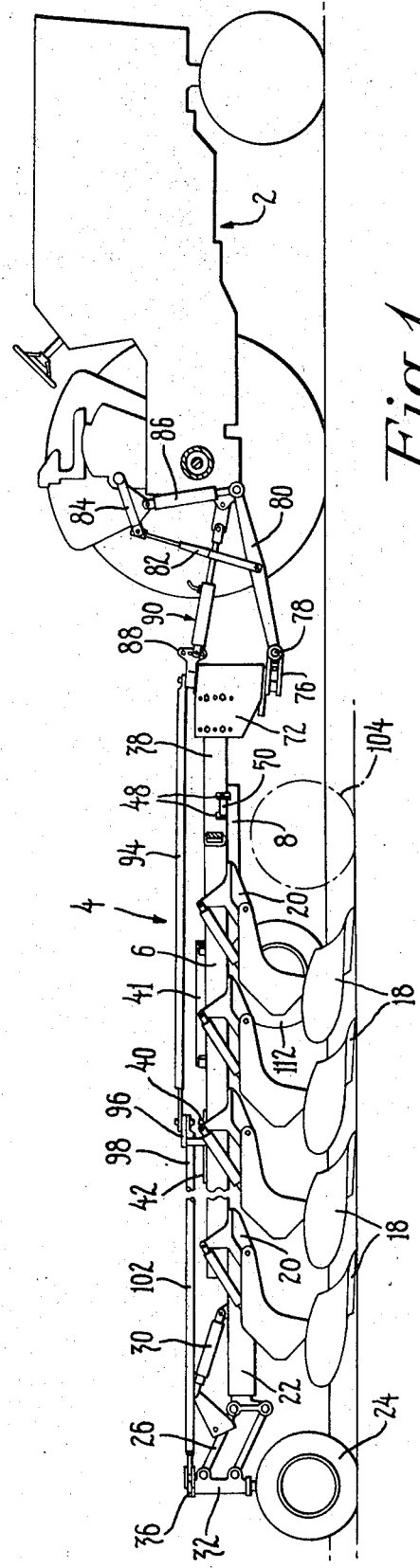

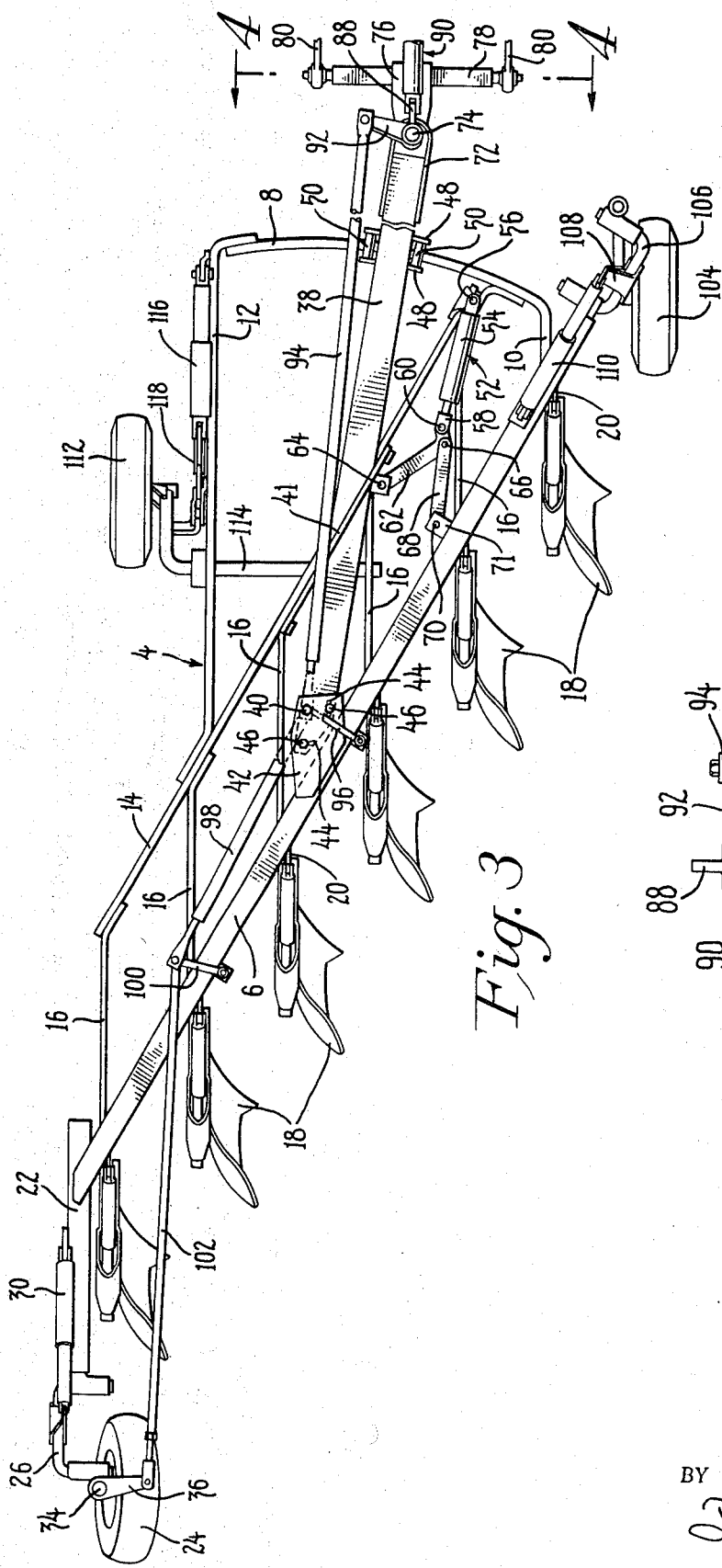

MULTIPLE BOTTOM PLOW

SUMMARY OF THE INVENTION

In accordance with the present invention, a semimounted or pull-type plow has a tongue or hitch member pivotally mounted on its frame for movement about an upright axis. A hydraulic ram or similar power element is interconnected between the hitch member frame to shift the hitch member about its pivotal axis and adjust the lateral position of the plow relative to the longitudinal axis of the tractor to thereby permit the hitch point to be changed.

BRIEF DESCRIPTION OF THE DRAWINGS

FIG. 1 is an elevational view of a tractor and multiple bottom plow with certain parts omitted for clarity;

FIG. 2 is an enlarged perspective view of the hitch apparatus of FIG. 1;

FIG. 3 is a plan view of the plow of FIG. 1; and

FIG. 4 is a view taken along lines 4—4 of FIG. 3.

DESCRIPTION OF THE PREFERRED EMBODIMENT

In FIG. 1, reference numeral 2 designates a tractor and reference numeral 4 collectively designates a plow connected to the tractor. The plow 4 includes a frame having a main beam 6 which extends obliquely or diagonally to the direction of travel, a front, curved frame member 8, and side frame members 10 and 12 which extend in a fore and aft or longitudinal direction.

A diagonal or oblique frame member 14 extends parallel to main beam 6 and is secured to side frame member 12 and the front frame member 8. A plurality of transversely spaced fore and aft or longitudinal frame members 16 extends between frame member 14 and the main beam 6. A plurality of plow bottoms 18 have their standards mounted on support brackets 20 secured to the frame members 10, 16 and main beam 6. Mounted on the trailing end of the main beam 6 is a fore and aft extending beam 22 for supporting a rear furrow wheel 24.

The furrow wheel 24 is mounted on conventional parallel links 26 suspended at the end of beam 22. A lever arm is mounted on the upper parallel link and is connected with a hydraulic ram 30 for raising and lowering wheel 24 relative to the plow frame. The outer ends of the parallel links 26 are connected with a vertical sleeve 32 in which is rotatably mounted a spindle 34 having a steering arm 36 projecting from its upper end. The wheel 24 is therefore steered by rotation of spindle 34 and steering arm 36.

A forwardly projecting tongue or hitch member 38 is pivotally mounted by a pin 40 to a plate 42 secured to the main beam 6 (FIG. 3). A plate 41 has leg members depending from its ends which are secured to frame member 14 so that plate member 41 defines a slot through which hitch member 38 extends. Resistance to torsional stresses on hitch member 38 is provided by bolts or pins 46 mounted on hitch member 38 and engaged in slots 44 formed in plate 42. The forward end of hitch member 38 is supported by rollers 50 on the curved front frame member 8. Rollers 50 are mounted between bracket plates 48 welded or otherwise secured to hitch member 38.

The position of hitch member 38 can be adjusted about pivot pin 40 by means of a hydraulic ram 52 (FIG. 3). Ram 52 has a cylinder 54 which is pivotally connected at 56 to frame member 14 and a piston 58 which is pivotally connected at 60 with one end of a lever 62. The other end of lever 62 is pivotally connected at 64 with a lug mounted hitch member 38. Mounted between lever 62 and main beam 6 is a link 68 which has its ends pivotally connected at 66 and 70 with lever 62 and a lug 71, respectively. It is apparent that extension of piston 58 from cylinder 54 will cause hitch member 38 to pivot in a counterclockwise direction about pivot pin 40 such that the forward end of the hitch member moves toward side frame member 12. Conversely, retraction of the ram 52 causes clockwise movement of hitch member 38 about pin 40 to move the forward end of the hitch member toward side frame member 10.

Mounted on the forward end of hitch member 38 is a U-shaped member 72 which forms a housing for a spindle 74 which is rotatably mounted within the U-shaped member 72 in the manner disclosed in detail in our copending application filed concurrently herewith entitled, "Weight Transfer Hitch For Plows," Ser. No. 664,684, the entire disclosure of which is incorporated herein by reference. Nonrotatably secured to the lower end of spindle 74 is a bracket 76 having a hollow sleeve portion and a cross bar 78 bolted in the sleeve portion of bracket 76. Cross bar 78 has its ends rotatably mounted in the ends of the draft links 80 of the tractor hitch. Draft links 80 are connected by drop links 82 with lift links 84 under the control of a hydraulic ram 86. As disclosed in the above referred to copending application, a bracket 88 is nonrotatably mounted at the upper end of spindle 74 on which is mounted one end of a hydraulic ram 90 for applying a force between the tractor and plow tending to rotate the plow about the axis of cross bar 78 to thereby transfer weight to the tractor and increase traction.

Mounted on the upper end of spindle 74 is a steering arm 92 which is interconnected with steering arm 36 on spindle 34 through motion transmitting mechanism including pivotally connected rods or links 94, 98 and 102. Link 94 is mounted between steering arm 92 and a lever 96 mounted on the main beam 6 near pivot pin 40. Link 98 is made up of telescopically adjustable rods and is mounted between lever 96 and lever 100. Link 102 extends from lever 100 to steering arm 36. Consequently, relative pivotal movement about the axis of spindle 74 between the tractor and plow causes wheel 24 to turn about the axis of spindle 34 and steer the plow accordingly.

A pull-type plow is disclosed in the illustrated embodiment and includes a front furrow wheel 104 mounted on the leading end of main beam 6. Wheel 104 is mounted on parallel links 106 in a manner similar to the mounting of the rear furrow wheel 24 and is raised and lowered relative to the plow frame by a hydraulic ram 110 mounted between the main beam 6 and a lever arm 108 mounted on the upper parallel link.

A land wheel 112 is supported on a shaft 114 on the opposite side of the plow frame from the furrow wheel 104 and is raised and lowered relative to the plow frame by a hydraulic ram 116 supported on side frame member 12. Ram 116 is interconnected with the shaft 114 by a conventional linkage 118.

It if is desired to plow with the right wheels of the tractor riding in a furrow, the hitch member 38 is adjusted toward side frame member 10. On the other hand, if it is desired to plow with the tractor entirely on unplowed ground, the hitch member is shifted accordingly by ram 52. Moreover, the center of resistance of the plow bottoms changes with the addition or removal of plow bottoms and the hitch member can be adjusted accordingly.

While a specific example of the invention has been illustrated and described, it will be apparent to those skilled in the art that the invention is not limited to the exact construction so shown, but that various alterations and modifications in the construction and arrangement of parts is possible without departing from the scope and spirit of the invention.

We claim:

1. A semimounted moldboard plow comprising a carrier frame, forward connecting means for connecting the carrier frame to the rear of a draft vehicle, ground support means on the carrier frame for supporting at least a portion of the weight of the carrier frame when it is connected with a draft vehicle and for controlling implement movement along a predetermined line of draft, a plurality of plow bottoms supported on the carrier frame operable to engage the ground at laterally spaced points as the carrier frame is drawn in the line of draft along the ground by the draft vehicle, a forwardly projecting hitch member having its rear end mounted on said carrier frame for pivotal movement about an upright axis, and wherein said forward connecting means is mounted on the forward end of the hitch member, said carrier frame including a front, curved frame member, fore and aft extending side frame members, and an oblique main beam extending between the side frame members; said hitch member including at least one surface for supporting the forward portion of the hitch member on the front, curved frame member, said forward connecting means being shiftable laterally relative to the carrier frame to selectively change the lateral position of the carrier frame relative to the draft vehicle without changing the line of draft or the effective width of the plow, said ground support means including a steerable rear wheel on the carrier frame, and linkage means connecting the steerable rear wheel with said forward connecting means for steering the plow in accordance with changes in the direction of the draft vehicle.

2. A moldboard plow as claimed in claim 1 further including power means for selectively shifting the forward connecting means relative to the carrier frame during travel.

3. A moldboard plow as claimed in claim 1 further including a hydraulic ram mounted between the carrier frame and hitch member for selectively actuating said hitch member about said upright axis.

4. A moldboard plow as claimed in claim 1 further including a lever pivotally mounted on said main beam having its free end located substantially at the upright pivotal axis of the hitch member, and wherein said linkage means includes a first rod connected between said forward connecting means and the free end of said lever such that pivotal movement of the hitch member during lateral shifting of the carrier frame relative to the draft vehicle will not affect the position of the steerable rear wheel.

5. The moldboard plow of claim 1 wherein said surface on the hitch member for supporting the forward portion of the hitch member on the front, curved frame member includes a roller.